United States Patent
Kikuchi et al.

[11] Patent Number: 6,023,116
[45] Date of Patent: Feb. 8, 2000

[54] ELECTROMAGNETIC ROTARY VIBRATOR FOR A ROTARY BODY

[75] Inventors: Kiyotaka Kikuchi, Naka-gun; Kiyoshi Gunji, Higashi-ibaraki-gun, both of Japan

[73] Assignee: Japan Nuclear Cycle Development Institute, Ibaraki-ken, Japan

[21] Appl. No.: 08/944,430

[22] Filed: Oct. 6, 1997

Related U.S. Application Data

[63] Continuation of application No. 08/623,954, Mar. 29, 1996, Pat. No. 5,834,867.

[30] Foreign Application Priority Data

Apr. 27, 1995 [JP] Japan ................................ 7-127207

[51] Int. Cl.$^7$ ................................................ H01L 41/08
[52] U.S. Cl. ................................................ 310/90.5
[58] Field of Search ............................. 310/90, 90.5, 51, 310/103, 105; 318/623, 460

[56] References Cited

U.S. PATENT DOCUMENTS

| | | | |
|---|---|---|---|
| 4,999,534 | 3/1991 | Andrianos | 310/90.5 |
| 5,142,175 | 8/1992 | Watanabe | 310/90.5 |
| 5,216,308 | 6/1993 | Meeks | 310/90.5 |
| 5,256,952 | 10/1993 | Yoneyama et al. | 318/629 |
| 5,306,975 | 4/1994 | Bichler | 310/90.5 |
| 5,313,399 | 5/1994 | Beale | 364/463 |
| 5,330,967 | 7/1994 | Takahata et al. | 505/166 |
| 5,355,042 | 10/1994 | Lewis et al. | 310/90.5 |
| 5,369,348 | 11/1994 | Gennesseaux | 318/623 |
| 5,373,207 | 12/1994 | Yamaguchi et al. | 310/90.5 X |
| 5,587,617 | 12/1996 | Dunfield et al. | 310/90.5 |
| 5,627,421 | 5/1997 | Miller et al. | 310/90.5 |
| 5,686,772 | 11/1997 | Delamare et al. | 310/90.5 |
| 5,763,972 | 6/1998 | Bernus et al. | 310/90.5 |
| 5,789,837 | 8/1998 | Shin et al. | 310/90.5 |
| 5,804,899 | 9/1998 | Jamain et al. | 310/90.5 |
| 5,835,124 | 11/1998 | Fukita et al. | 310/90.5 X |

FOREIGN PATENT DOCUMENTS

| | | |
|---|---|---|
| 0275791 | 7/1988 | European Pat. Off. . |
| 0552970 | 7/1993 | European Pat. Off. . |
| 0566806 | 10/1993 | European Pat. Off. . |
| 4-351348 | 12/1992 | Japan . |
| 94/29610 | 12/1994 | WIPO . |

OTHER PUBLICATIONS

English Language Abstract of Japanese Patent No. 62219635, dated Sep. 26, 1987.
English Language Abstract of Japanese Patent No. 01131354, dated May 24, 1989.
English Language Abstract of Japanese Patent No. 05071575, dated Mar. 23, 1993.
English Language Abstract of Japanese Patent No. 03134338, dated Jun. 7, 1991.

*Primary Examiner*—Mark O. Budd
*Attorney, Agent, or Firm*—Wenderoth, Lind & Ponack, L.L.P.

[57] ABSTRACT

An apparatus for electromagnetically and rotationally vibrating a rotary body that is supported by bearings. The apparatus comprises a ring-shaped magnet bipolarly magnetized and mounted coaxially on a shaft of the rotary body, a ring-shaped stator having a coil and adapted to generate a rotating magnetic field by controlling an electric current supplied to the coil, and a frequency variable vibration power source adapted to supply alternating electric power to the coil in the stator. The distance between a location of a magnetic pole in the stator and an axis of the shaft is different than the distance between a location of a magnetic pole in the magnet and the axis of the shaft. The magnet and the stator are disposed so as to be adjacent to each other. Thus a rotational exciting force is applied to the rotary body by an interaction of the rotating magnet field generated by the stator with the magnet. This electromagnetic rotary vibrator can be applied to a damper for offsetting the unbalanced vibration of a rotary body.

4 Claims, 9 Drawing Sheets

ELECTROMAGNETIC ROTARY VIBRATOR FOR A ROTARY BODY

This is a continuation application of U.S. Ser. No. 08/623,954, filed Mar. 29, 1996 now U.S. Pat. No. 5,834,867.

BACKGROUND OF THE INVENTION

This invention relates to techniques for electromagnetically and rotationally-vibrating a rotary body supported by bearings, and more particularly relates to an electromagnetic rotary vibrator, for a rotary body, which is adapted to apply a rotational exciting force to the rotary body by using a bipolarly magnetized ring-shaped magnet and a ring-shaped stator which are adapted to generate a rotating magnetic field by controlling an electric current that is supplied to a coil. This invention also includes a damper for a rotary body which uses the above-described vibrator.

A rotary machine has a critical speed at which a vibration amplitude increases suddenly when a revolution velocity of the rotary body increases to coincide with a natural frequency. A rotary body used to pass a critical speed is subjected to a test for the purpose of minimizing a vibration amplitude generated by the influence of such a use, thereby evaluating the balance of the vibration of the rotary body and carrying out a suitable balancing operation. Rotary machines, such as first-order passing type to N-th order passing type rotary machines, are especially adapted to pass critical speeds to reach a rated revolution velocity and are thus subjected to tests so as to pass the critical speeds, in the same manner as the above-mentioned rotary body, and a suitable balancing operation is carried out because otherwise, a rated revolution velocity cannot be attained. A balancing, operation for a rotary body is necessarily carried out in this manner.

According to the conventional balancing techniques, a rotary body is installed in an operable rotary machine, and unbalanced vibration is measured with the rotary machine in operation. On the basis of the results of measurement, either a balance weight is attached to the rotary body, or conversely, the rotary body is shaved, whereby the vibration of the rotary body is suppressed. In an actual rotation test, the determination of the vibrational amplitude and the calculation and correction of balance have to be performed at each and every critical speed. Namely, very complicated operations requiring extensive labor and time have to be carried out.

In recent years, a displacement feedback control method using a controlling type magnetic bearing has been studied as one method of solving these problems. A controlling type magnetic bearing is originally adapted to apply a force to a rotary shaft so that the rotary shaft is constantly maintained in a neutral position in the same bearing. In a damping operation using this controlling type magnetic bearing, an exciting force offsetting an unbalanced vibration of a rotary body, and synchronous with the rotation of the body, is applied in a superposed manner to the controlling type magnetic bearing so as to suppress the vibration and allow the body to pass critical speeds so that balance evaluation can be carried out. Such a method is disclosed in, for example, Japanese Patent Laid-Open Application No. 4-351348/1992.

A controlling type magnetic bearing is basically adapted to attract a magnetic substance of a rotary shaft to electromagnetic actuators and retain the rotary shaft in a neutral position in the bearing. The electromagnetic actuators, the attractive force of two poles which act on one position, are used by arranging them in four directions of an XY plane (a plane perpendicular to a direction Z in which the rotary shaft extends). In order to generate a rotating magnetic field for applying a exciting force to a rotary body, rotational synchronous single-phase electric power of sine and cosine waves is generated by using a personal computer-controlled DSP (digital signal processor) or a tracking filter circuit, and the generated rotational synchronous single-phase electric power is superposed to the neutral position, which retains electric power, of the electromagnetic actuators arranged in the XY plane.

However, since the controlling type magnetic bearings are originally adapted to apply a force to, and control, a rotary shaft so that the rotary shaft is retained constantly in a neutral position in the bearings as mentioned above, an exciting force, offsetting unbalanced vibration and synchronous with the rotation of the rotary body, constitutes a disturbance to the magnetic bearings and causes the action of the bearings to become unstable. Namely, an exciting force due to the effect of the attractive rotating magnetic field of the controlling type magnetic bearings is generated for obtaining a spring effect by displacement feedback and a damping effect by speed feedback, and the original function of the controlling type magnetic bearings works so as to offset this disturbance (exciting force). Therefore, a very difficult control operation is required to correct the unstable bearings.

The functioning of the electromagnetic actuators which attract the magnetic substance of the rotary shaft and which are arranged in four directions of XY plane, work only solely at an instant, and they do not work with full power, such that an exciting force is small. This causes the dimensions of the electromagnetic actuators to increase. Regarding a control operation, problems such as a feedback delay occur. Although the electromagnetic actuators basically work so as to attract the rotary body, an unnecessary rotational force is also produced, and this causes whirling (self-excited vibration of the rotary body). Moreover, in view of the DSP response characteristics, the attainment of a high revolution velocity and the passage of a high-order critical speed are difficult to achieve in the foregoing.

SUMMARY OF THE INVENTION

An object of the present invention is to provide an apparatus which is capable of electromagnetically applying a rotational exciting force having an arbitrary frequency to a rotary body in an efficient manner.

Another object of the present invention is to provide a damper for a rotary body, adapted to offset the unbalanced vibration of the rotary body by electromagnetically applying vibration of an amplitude equal to that of the unbalanced vibration and of a phase opposite to that of the unbalanced vibration, to the rotary body.

According to the present invention, there is provided an apparatus for electromagnetically and rotationally vibrating a rotary body which is supported by bearings. This apparatus comprises a ring-shaped magnet which is bipolarly magnetized and is coaxially mounted on a shaft of the rotary body, a ring-shaped stator having a coil and adapted to generate a rotating magnetic field by controlling an electric current supplied to the coil, and a frequency-variable vibration power source adapted to supply alternating electric power to the coil in the stator. The distance between a location of a magnetic pole in the stator and an axis of the shaft is different than the distance between a location of a magnetic pole in the magnet and the axis of the shaft. Thus a rotational exciting force is applied to the shaft of the rotary body by interacting the rotating magnetic field generated by the stator with the magnet.

The ring-shaped magnet may be mounted directly on the rotary shaft, or on a static portion of a bearing mounted on the rotary shaft. The magnet is preferably a permanent magnet, and may be an electromagnet. For example, there is a structure in which an axially bipolarly magnetized permanent magnet constituting the ring-shaped magnet, and a stator are disposed so that the magnet and the stator are adjacent to each other. Such a structure may also be employed that has a radially bipolarly magnetized permanent magnet constituting the ring-shaped magnet, and a stator which are disposed so as to be adjacent to each other radially in the same plane.

According to the present invention, there is also provided a damper, using the above-described electromagnetic rotary vibrator, which is adapted to offset unbalanced vibration of the rotary body supported by bearings. This damper comprises an electromagnetic rotary vibrator provided with a ring-shaped magnet which is bipolarly magnetized and is coaxially mounted on a shaft of the rotary body, and a ring-shaped stator having a coil and adapted to generate a rotating magnetic field by controlling an electric current supplied to the coil. The distance between a location of a magnetic pole in the stator and an axis of the shaft is different than the distance between a location of a magnetic pole in the magnet and the axis of the shaft. A rotation exciting force is applied to the shaft of a rotary body by an interaction of the rotating magnetic field generated by the stator with the magnet. A meter is provided with a rotation sensor for detecting a revolution velocity of the rotary body. Also provided is a damping power source adapted to generate a sine wave signal of a frequency which is synchronous with the rotation of the rotary body by an output pulse from the rotation sensor and to supply a driving output, which is obtained by controlling the phase and amplitude of the sine wave signal, to the coil of the stator. Thus vibration of a phase, opposite to that of the unbalanced vibration of the rotary body and of an amplitude substantially equal to that of the unbalanced vibration of the rotary body, is generated by the electromagnetic rotary vibrator.

In this damper for a rotary body, the meter is preferably provided, in addition to the rotation sensor for detecting a revolution velocity of the rotary body, with a vibration sensor for detecting the vibration of the rotary body, and a measuring instrument for determining the phase and amplitude of the vibration on the basis of outputs from the two sensors. The damping power source is provided with a phase locked loop or phase synchronizing loop adapted to generate a signal of a frequency which is synchronous with the rotation of the rotary body by an output pulse from the rotation sensor, a sine ROM for storing sine wave data, a D/A converter adapted to carry out D/A conversions on the basis of the sine wave data read from the sine ROM, and a phase-voltage controller adapted to control the sine wave data which is outputted from the sine ROM, in such a manner that the phase of the sine wave data becomes opposite that of the unbalanced vibration of the rotary body obtained from the measuring instrument, and to control an output from the D/A converter in such a manner that the amplitude of the output from the D/A converter substantially corresponds to that of the unbalanced vibration of the rotary body.

In the electromagnetic vibrator for a rotary body, the distance between a location of a magnetic pole in the stator and an axis of the shaft is different than the distance between a location of a magnetic pole in the magnet and the axis of the shaft, so that a resultant force based on the interaction, i.e. repulsion and attraction of the magnetic field generated by the stator and the magnet, is exerted in a plane perpendicular to the axial direction of the rotary shaft. This resultant force rotates around the shaft in accordance with the rotating magnetic field generated by the stator. Consequently, the rotational exciting force is exerted on the rotary body. The rotational exciting force can be controlled freely on the basis of the value, frequency and phase of the alternating current supplied to the stator.

Figure 1:
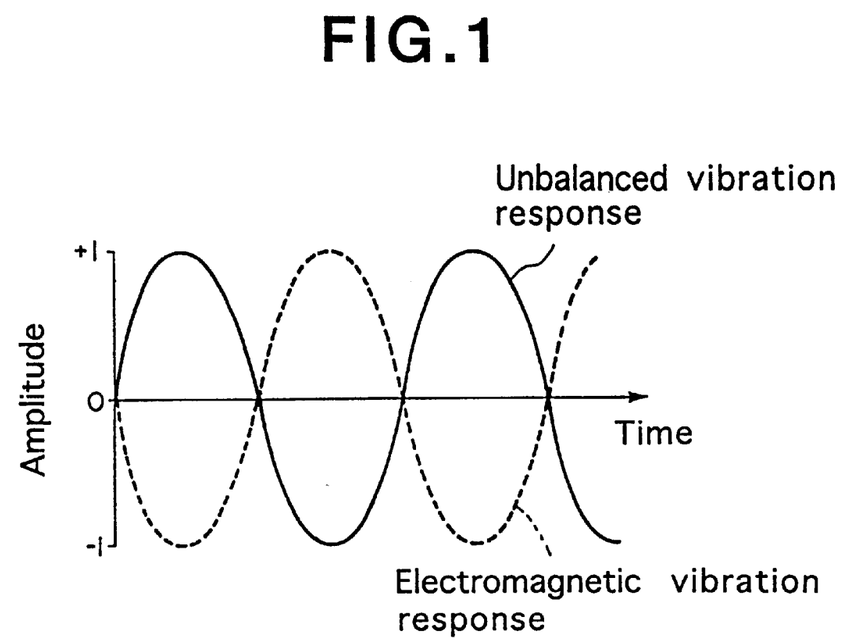
FIG. 1 is an explanatory drawing showing a vibration waveform in the vicinity of a critical speed.
Figure 2:
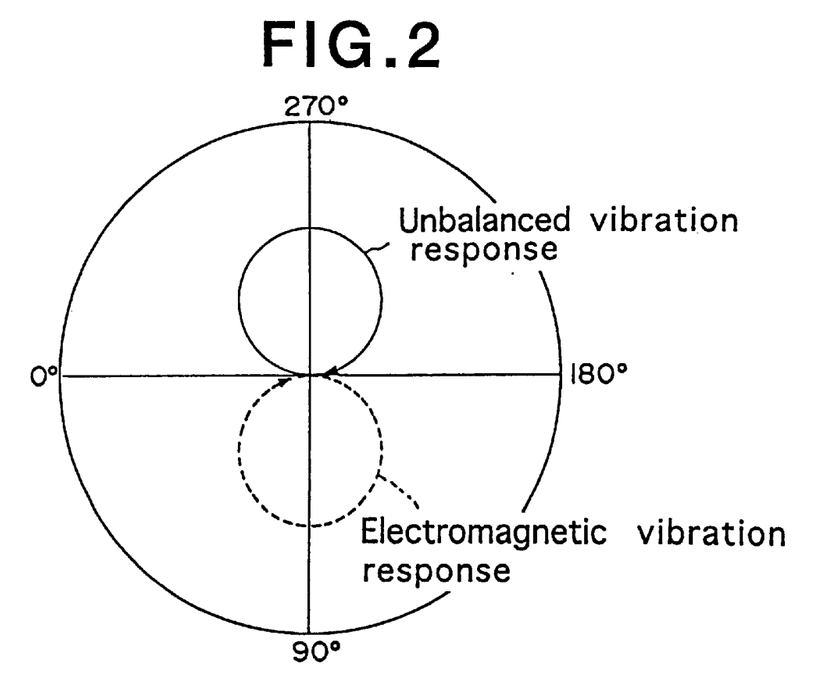
FIG. 2 is an explanatory drawing showing an example of a Nyquist diagram in the vicinity of a critical speed.

When vibration, having a phase opposite to that of the unbalanced vibration of the rotary body and having an amplitude substantially equal to the unbalanced vibration, is applied electromagnetically to the rotary body, the unbalanced vibration is offset. For example, a typical example is shown schematically in FIGS. 1 and 2. When an electromagnetic vibrational response, shown by the broken line, is applied to an unbalanced vibrational response, shown by the solid line, in a simple harmonic vibration waveform on a time axis as shown in FIG. 1. a synthesized waveform of the solid line and broken line constitutes an offset waveform. FIG. 2 is a Nyquist diagram which is representative of the response shown in FIG. 1, and indicates that a synthesized vibrational response in which an unbalanced vibrational response and an electromagnetic vibrational response, the phase of which is opposite to that of the unbalanced vibrational response, are combined and thus, the unbalanced vibration and electromagnetic vibration offset each other. Therefore, the passage of an N-order critical speed can be performed by practicing the above-described operation each time the rotary body passes a critical speed.

PREFERRED EMBODIMENTS OF THE INVENTION

Figure 3:
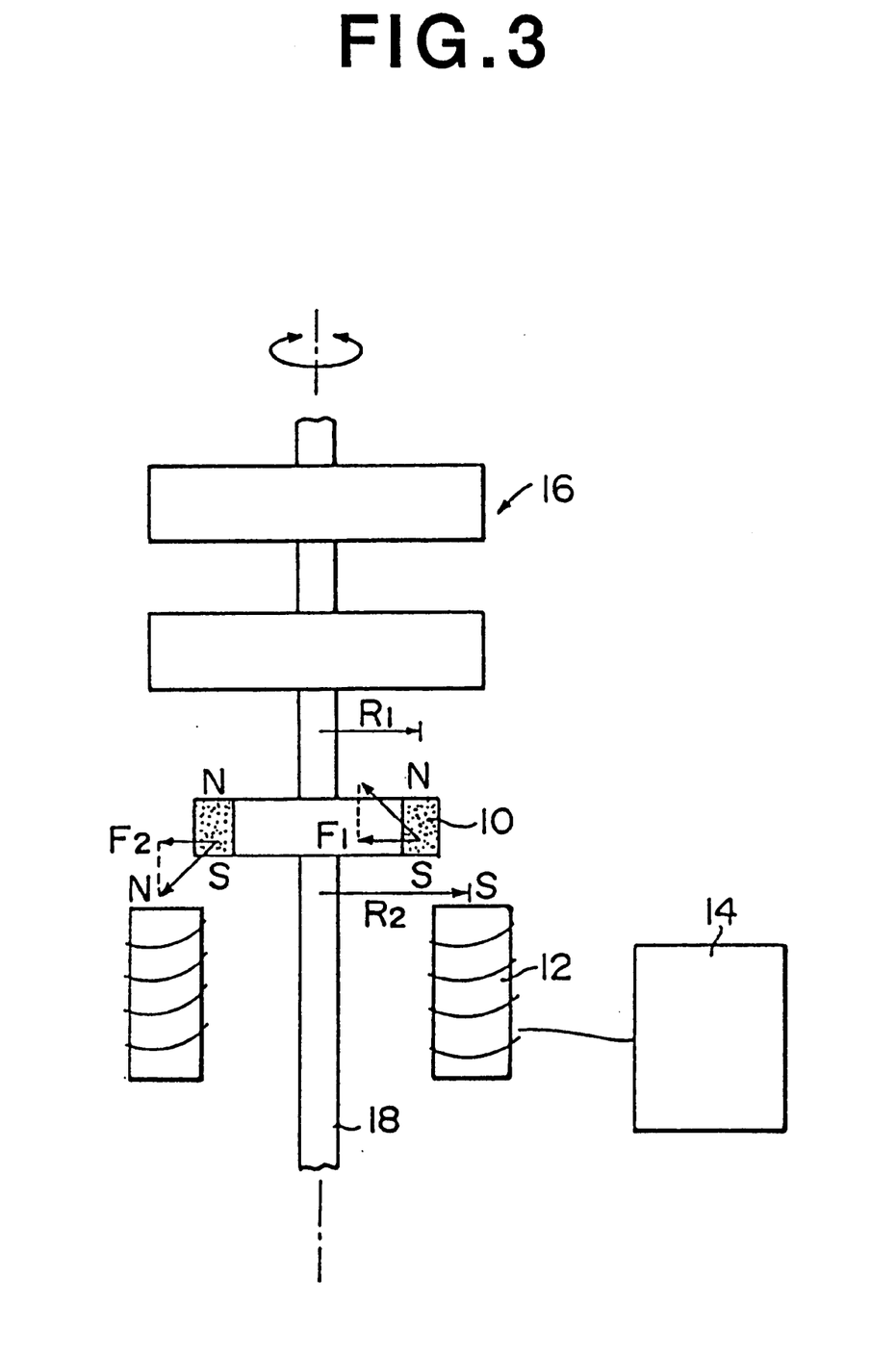
FIG. 3 is a schematic explanatory drawing showing an embodiment of the electromagnetic rotary vibrator according to the present invention.
Figure 3A:
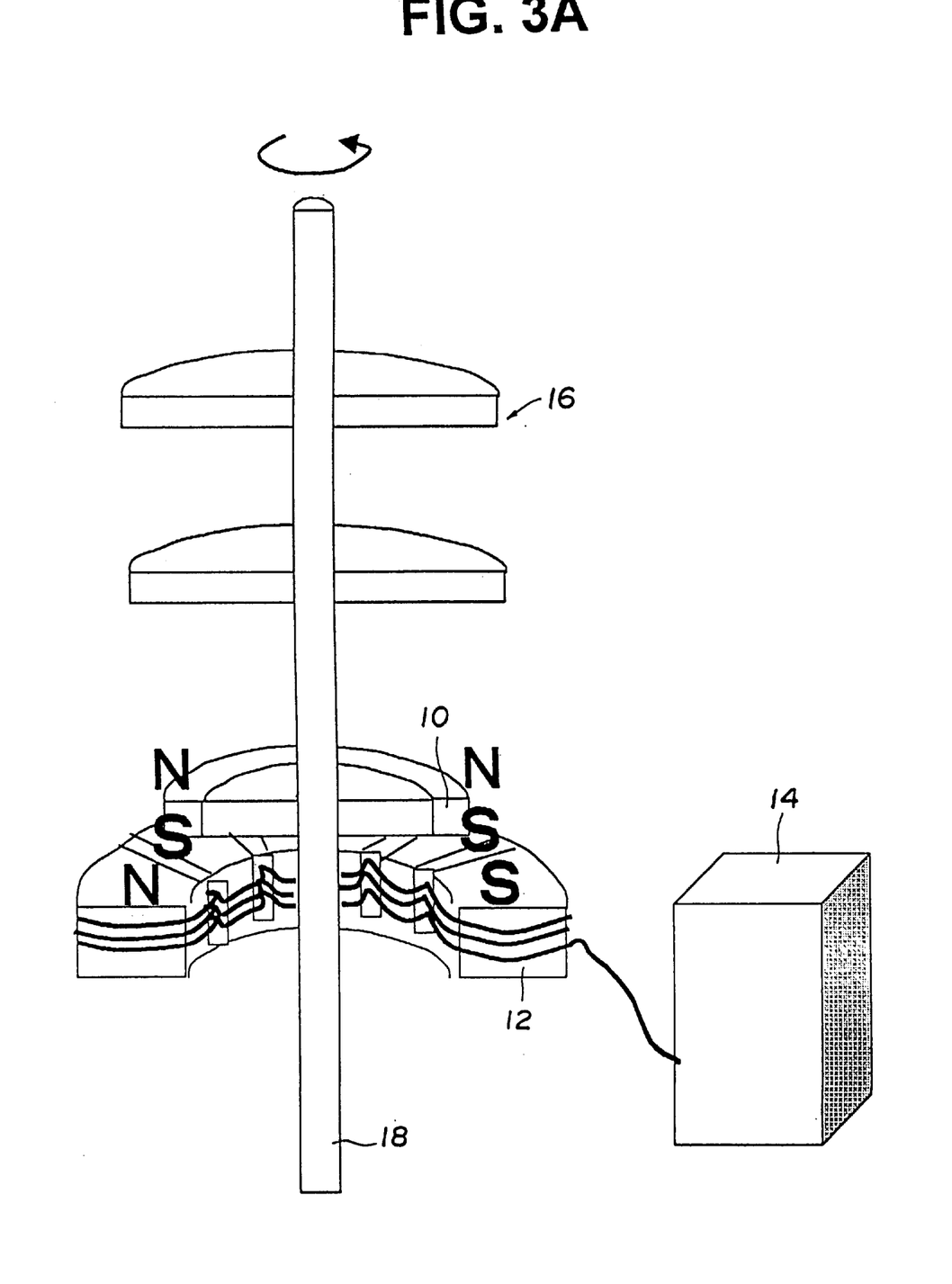
FIG. 3A is a perspective view of FIG. 3.

FIG. 3 shows a basic construction of an electromagnetic rotary vibrator for a rotary body according to an embodiment of the present invention and FIG. 3A shows a perspective view of FIG. 3. This apparatus is adapted to apply a rotational exciting force to an arbitrary rotary body supported rotatably by a passive bearing (not shown), and comprises a ring-shaped permanent magnet 10, a ring-shaped stator 12 having a coil and a vibration power source 14. The permanent magnet 10 is axially bipolarly magnetized in the axial direction, and is coaxially mounted on the rotary body 16 (a shaft 18 of the rotary body in this embodiment) coaxially. The stator 12 may have the same construction as a regular induction motor, and is adapted to generate a substantially bipolar rotating magnetic field with an electric current controllably supplied to the coil of the stator. The permanent magnet 10 and the stator 12 have. The distance between a location of a magnetic pole in the stator and an axis of the shaft is different than the distance between a location of a magnetic pole in the magnet and the axis of the shaft (distance between a position in which a magnetic pole is formed and the axis of the rotary body shaft 18, the magnetic radii of the permanent magnet and the stator being represented by symbols R1, R2 respectively). The vibration power source 14 is a frequency-variable inverter for supplying an alternating electric power to the coil of the stator 12.

In the structure of the rotary vibrator shown in FIG. 3, the ring-shaped permanent magnet 10 is magnetized so that, for example, the upper and lower surfaces thereof have an N-pole and an S-pole respectively. Assume that an S-pole and an N-pole occur at a certain instant in the right and left side portions respectively in the drawing of the stator 12 due to a current supplied to the coil. Consequently, a left-upward electromagnetic force due to the repulsive force of the S-poles occurs in the right side portion in the drawing, while a left-downward electromagnetic force due to an attractive force between the N- and S-poles occurs in the left side portion in the drawing. If they are synthesized, the components in the axial direction of the permanent magnet 10 are in opposite directions and they, therefore, offset each other. However, the components F1, F2 in the direction (in a horizontal plane in the drawing) perpendicular to the axial direction are in the same direction and are therefore summed up to turn into a eccentric force. The direction of a magnetic field occurring in the stator 12 changes circularly in accordance with the frequency of the alternating electric power supplied from the vibration power source 14, so that the direction of an electromagnetic eccentric force supplied to the permanent magnet 10 also changes circularly. This eccentric force can be controlled on the basis of the frequency and value of the alternating current supplied to the stator 12. Namely, due to the interaction of the rotating magnetic field generated in the stator 12 with the permanent magnet 10, a desired level of a rotational exciting force can be applied to the rotary body 16, and an electric input generates a high-quality exciting force of a rotational vibration vector.

The inverter used as the vibration power source 14 is generally set to produce a rectangular wave having a variable voltage and frequency by temporarily turning the commercial electric current into a direct current, and carrying out the positive-negative voltage switching in accordance with the frequency. Such a rectangular wave inverter is commercially available and can be easily obtained inexpensively The waveform of the vibrating AC power may be a sine waveform in addition to a rectangular waveform. However, a sine wave inverter is expensive and not generally preferred.

The above-described rotary vibrator for a rotary body according to the present invention is an optimum embodiment, but a structure for applying a rotational exciting force to a rotary body is not limited to the above-described embodiment. For example, although a permanent magnet is used as the ring-shaped magnet in the above embodiment, it may be replaced by an electromagnet. In this case, a structure having a winding around a magnetic core (not shown) may be mounted on the shaft of the rotary body by supplying an electric current to the winding via a brush as used in conventional DC motors.

Figure 4:
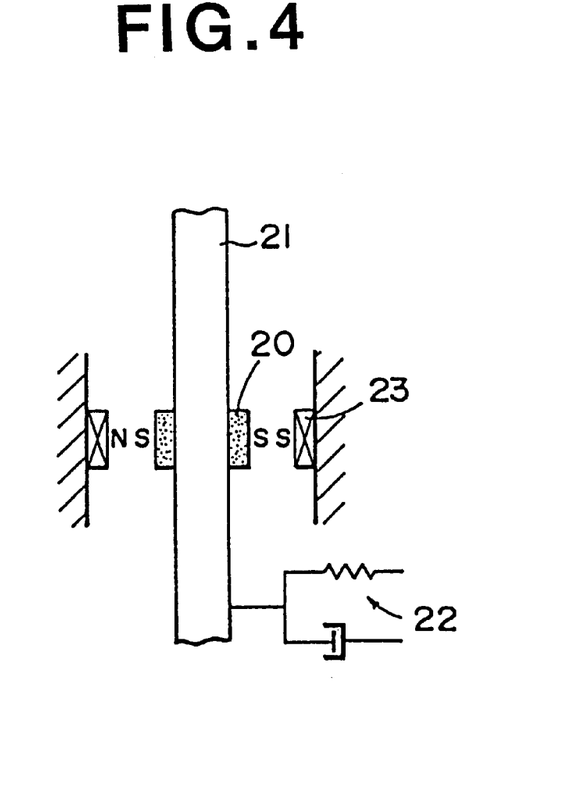
FIG. 4 is an explanatory drawing showing another embodiment of the electromagnetic rotary vibrator according to the present invention.
Figure 4A:
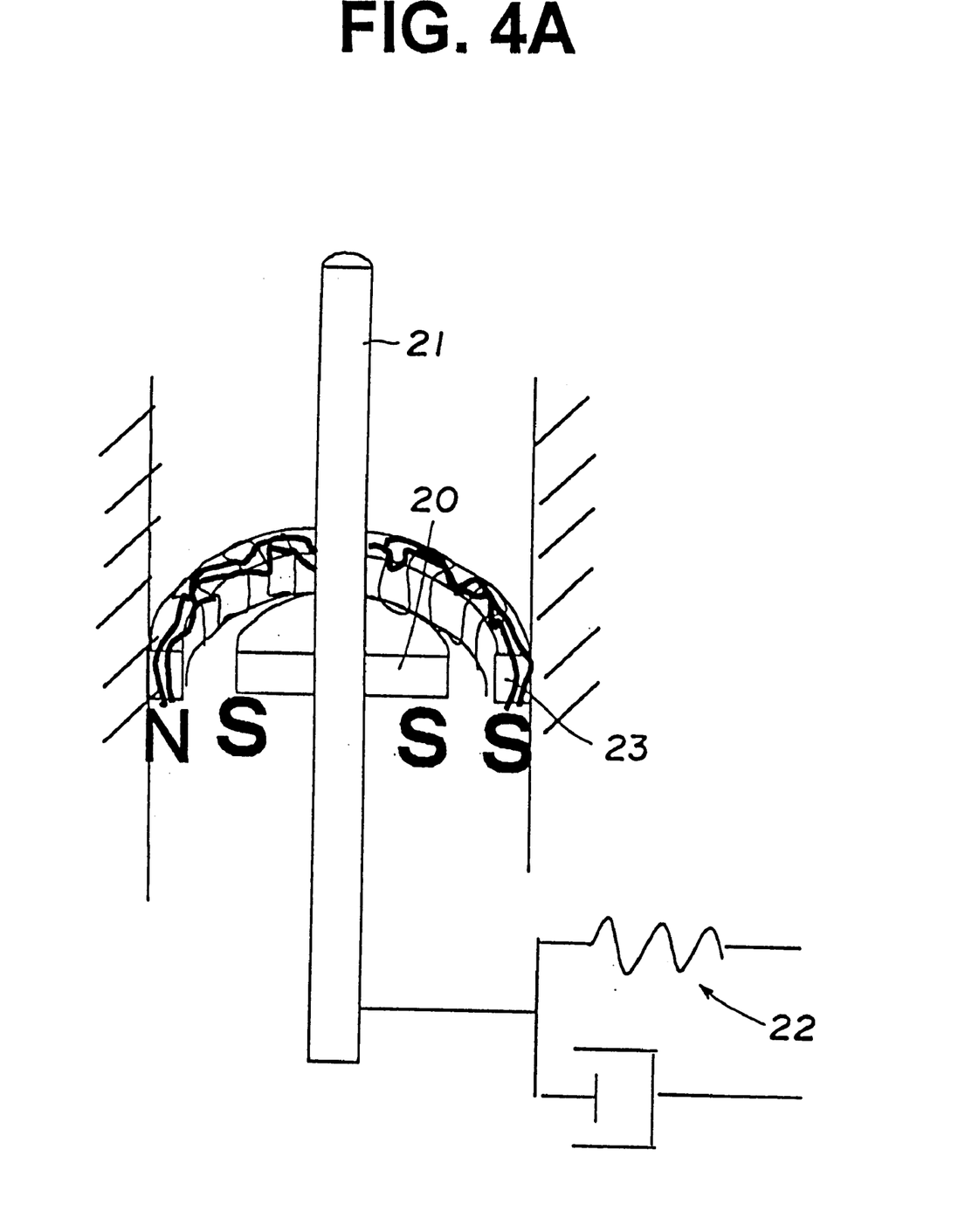
FIG. 4A is a perspective view of FIG. 4.

It is also possible to dispose the magnet and the stator in the same plane. An example of such an arrangement is shown in FIG. 4, and a perspective view of FIG. 4 is shown in FIG. 4A. A ring-shaped permanent magnet 20 is radially bipolarly magnetized (the outer circumferential surface has an S-pole, and the inner circumferential surface an N-pole) and mounted on a rotary body 21. The rotary body 21 is rotatably supported by a bearing 22. A stator 23 is ring-shaped, and is adapted to generate a rotating magnetic field with an electric current, which is supplied to a coil and controlled properly. The permanent magnet 20 and the stator 23 are disposed in the same plane so as to be adjacent to each other in the radial direction (i.e., the permanent magnet 20 is positioned on the inner side of the stator 23). If a magnetic field generated by the stator in this structure at a certain instant is in the condition, for example, as shown in FIG. 4, an attractive force of different poles occurs in a left portion of the rotary body 21, while a repulsive force of the same poles occurs in a right portion of the rotary body. Consequently, a leftward force is exerted on the rotary body 21. Since this force rotates with the rotating magnetic field generated by the stator 23, the rotary body 21 receives an exciting force which is rotated about the shaft.

Figure 5:
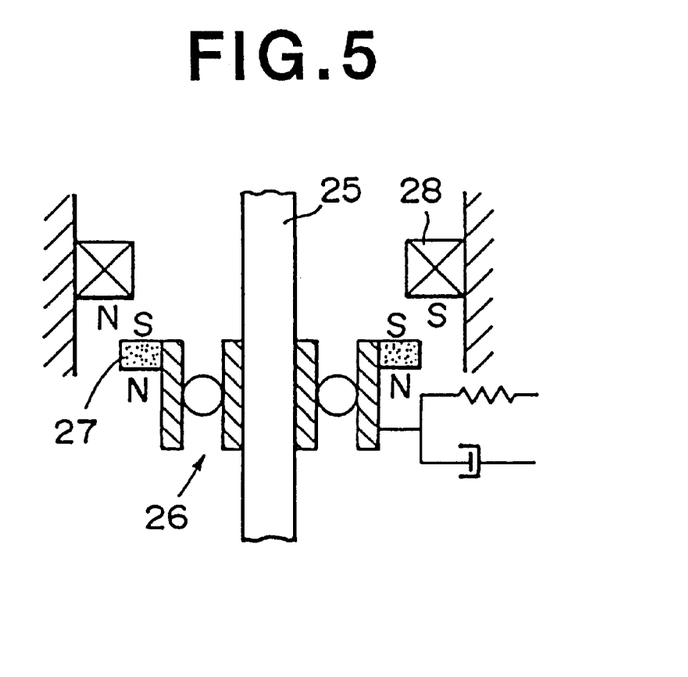
FIG. 5 is an explanatory drawing showing still another embodiment of the electromagnetic rotary vibrator according to the present invention.
Figure 5A:
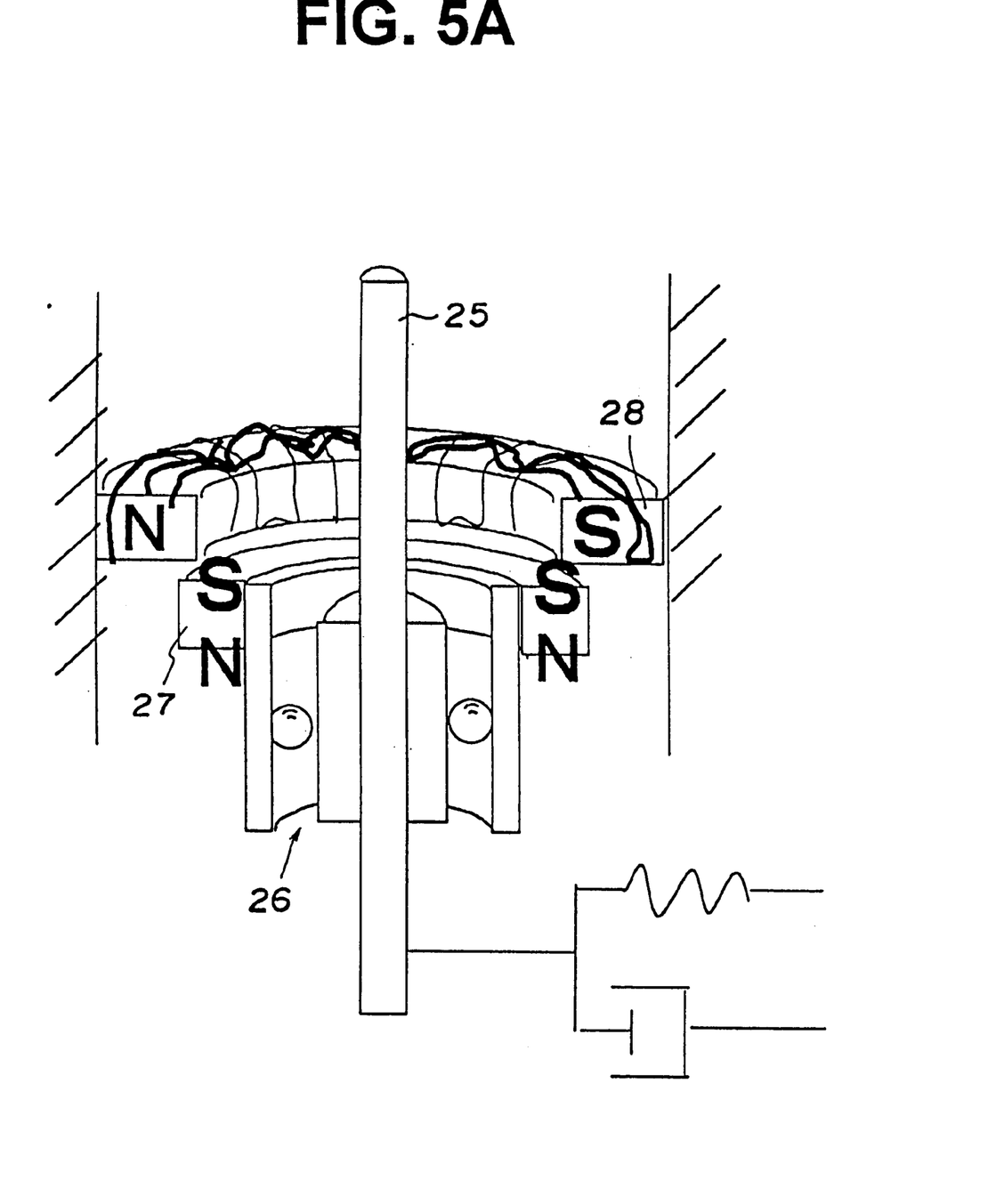
FIG. 5A is a perspective view of FIG. 5.

Although the magnet is mounted directly on the rotary body in both of the above-described examples as shown in FIGS. 3 and 4, it may be mounted via a bearing. Such an example is shown in FIG. 5, and a perspective view of FIG. 5 is shown in FIG. 5A. A ball bearing 26 is mounted on a rotary body 25, and a ring-shaped permanent magnet 27 is mounted on a static portion of the bearing 26. In this example, the permanent magnet is axially bipolarly magnetized just as the permanent magnet shown in FIG. 3. A ring-shaped stator 28 is disposed so as to be adjacent axially to the permanent magnet 27. Such an arrangement of the magnet mounted via a bearing has the advantage in that the magnet does not receive rotational stress, so that an electromagnet can be easily installed. However, since a load is imparted to the bearing, consideration must be given so as to prevent the seizure of the bearing.

Figure 6:
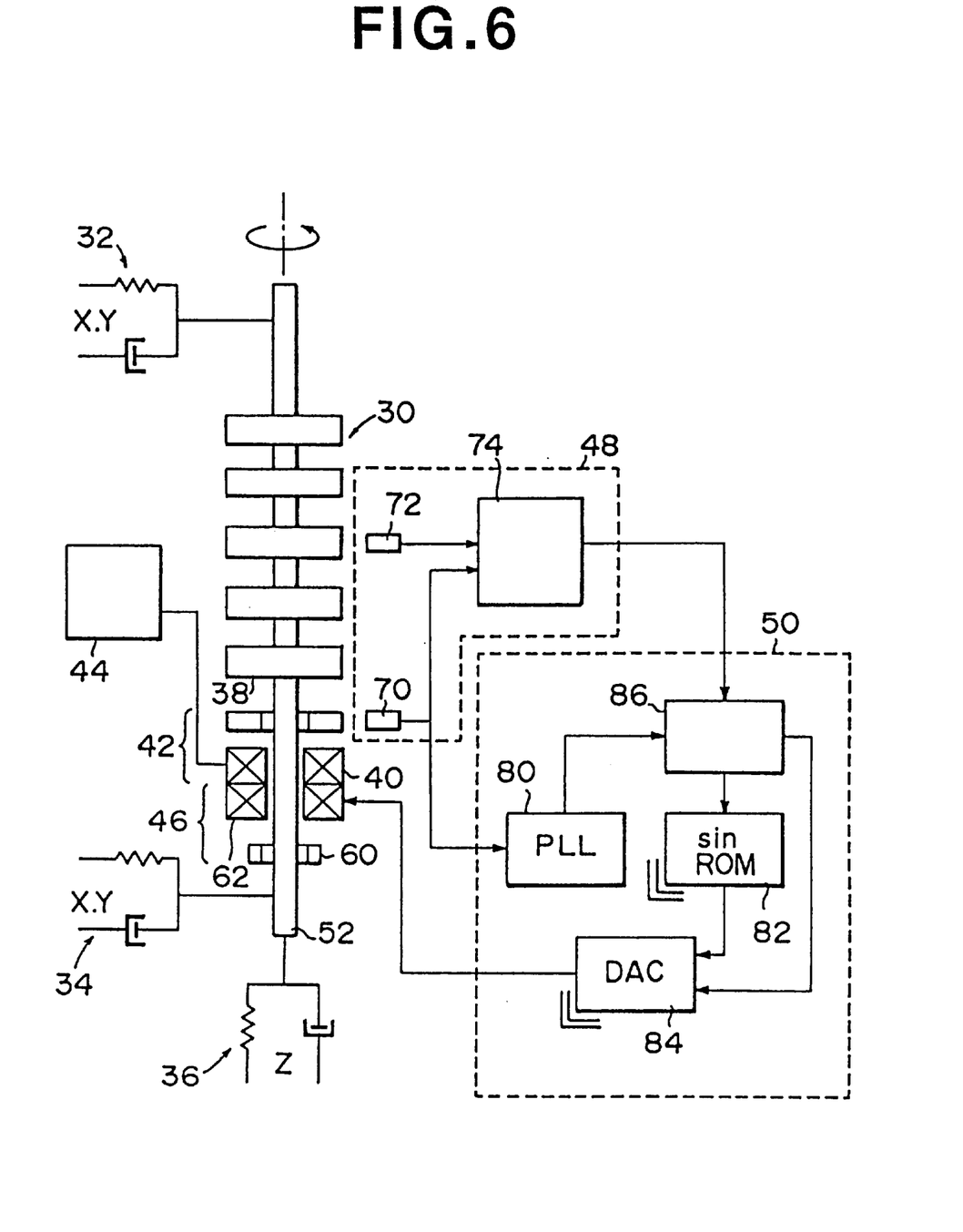
FIG. 6 is a schematic block diagram showing an embodiment of the damper according to the present invention.
Figure 6A:
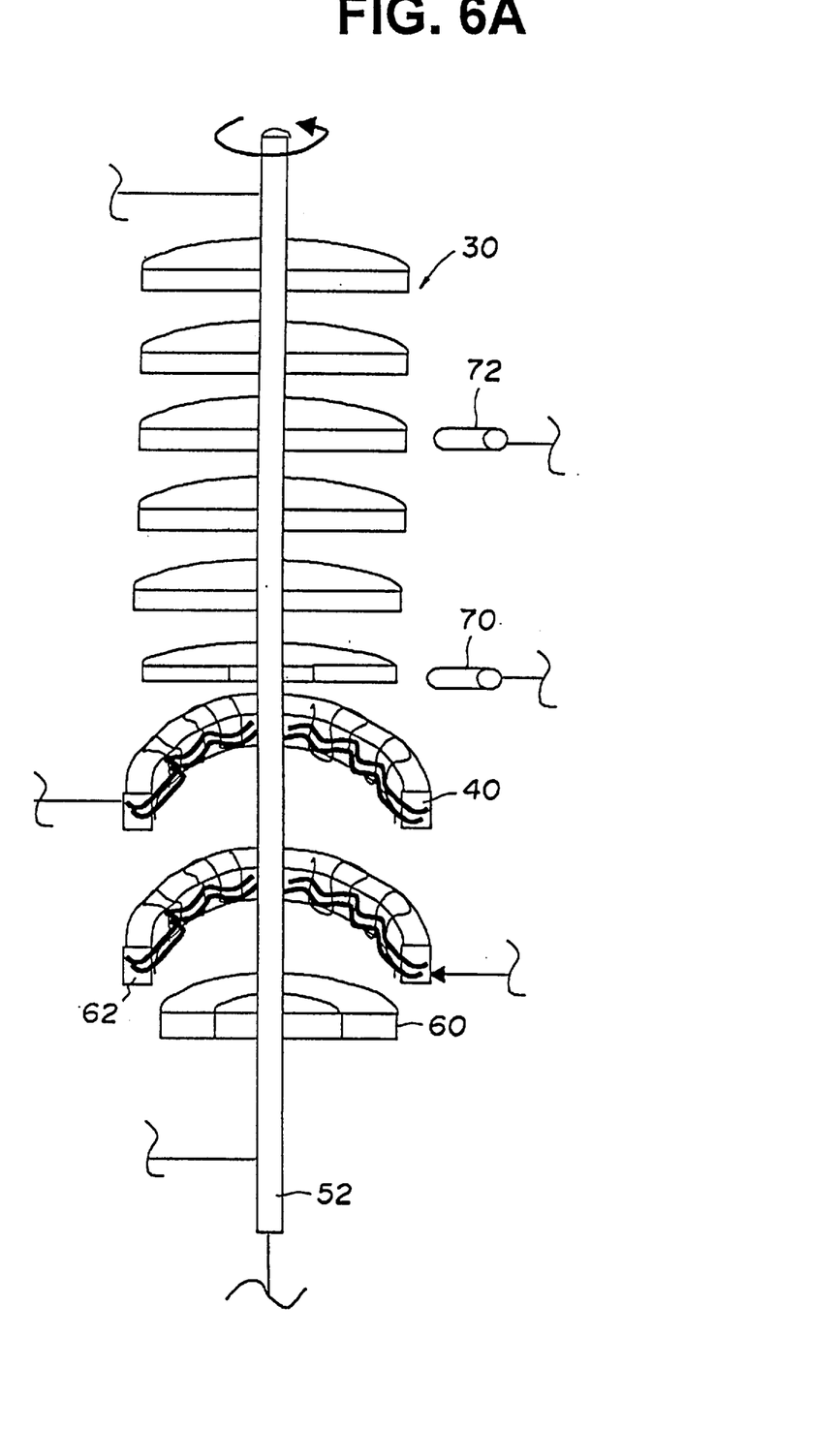
FIG. 6A is a perspective view of FIG. 6.

A damper is provided for a rotary body as one of applied examples of the above-described electromagnetic rotary vibrator for a rotary body. An example of schematic construction of the damper is shown in FIG. 6, and FIG. 6A shows a perspective view of FIG. 6. A rotary body 30 to which the damper is applied is supported in a horizontal plane (XY directions), by upper and lower bearings 32 arid 34, each of which has a spring and a damping member, and in a vertical plane (Z direction), by a thrust bearing 36 also having a spring and a damping member. The rotary body 30 further has a driving motor 42 comprising a permanent magnet 38 and a stator 40, and is rotated at a desired speed by supplying an electric current from the driving inverter 44 to the stator 40. The damper for the rotary body according to the present invention is provided with an electromagnetic rotary vibrator 46, a meter 48 and a damping power source 50, and the damper is formed so as to offset the unbalanced vibration of the rotary body by generating by using the electromagnetic rotary vibrator, vibration having a phase which is opposite to that of the unbalanced vibration of the rotary body, and having an amplitude which is substantially equal to that of the unbalanced vibration.

The construction of the electromagnetic rotary vibrator 46 may be basically identical with that of the rotary vibrator shown in FIG. 3, and is provided with a ring-shaped permanent magnet axially and bipolarly magnetized and mounted on a shaft 52 of the rotary body, and a ring-shaped stator 62 having et coil and adapted to generate a rotating magnetic field with an electric current controllably supplied to the coil of the stator. The distance between a location of a magnetic pole in the stator and an axis of the shaft is different than the distance between a location of a magnetic pole in the magnet and the axis of the shaft. The permanent magnet 60 and the stator 62 disposed so as to be adjacent to each other axially. A rotational exciting force is applied to the rotary body by an interaction of the rotating magnetic field generated by the stator with the permanent magnet.

The meter 48 is provided with a rotation sensor 70 for detecting a revolution velocity of the rotary body, a vibration sensor 72 for detecting the vibration of the rotary body, and a measuring instrument 74, such as an oscilloscope or a FFT (high-speed Fourier transformer), adapted to determine the phase and amplitude of the vibration on the basis of outputs from the two sensors 70, 72.

The damping power source 50 generates a sine wave signal having a frequency that is synchronous with the rotation of the rotary body by an output pulse from the rotation sensor 70, and supplies a driving output, which is obtained by controlling the phase and amplitude of the signal, to the coil of the stator 62 in the electromagnetic rotary vibrator 46. The damping power source in this embodiment is provided with a phase synchronizing loop or a phase locked loop (PLL) 80 which is adapted to generate a signal having a frequency that is synchronous with the rotation of the rotary body by an output pulse from the rotation sensor 70, a sine ROM 82 for storing sine wave data, a D/A converter 84 adapted to carry out D/A conversions in accordance with the sine wave data read out from the sine ROM 82, and a phase-voltage controller 86 adapted to control the sine wave data outputted from the sine ROM 82, in such a manner that the phase of the sine wave data becomes opposite to that of the unbalanced vibration of the rotary body obtained from the measuring instrument 74, and to control an output from the D/A converter 74 in such a manner that the amplitude of the output from the D/A converter substantially corresponds to that of the unbalanced vibration of the rotary body. The phase-voltage controller 86 controls the D/A converter 84 on the basis of a signal that is synchronous with the rotation of the rotary body and obtained from the phase synchronizing loop 86 and a vibrational response which can be determined by the measuring instrument 74. In this damper, the vibration condition is grasped by the measuring instrument 48, and a damping force corresponding to the unbalanced vibration of the rotary body is outputted from the electromagnetic rotary vibrator 46 on the basis of the power from the damping power source 50, whereby the damping of the rotary body is performed.

This damper is of a closed loop control system, and can also be applied to an open loop control system. The vibration of the rotary body is grasped by the measuring instrument. The damping of the rotary body can be performed by controlling the phase and voltage manually using the phase-voltage controller on the basis of the measured vibration. As long as the entire vibration of the rotary body has been grasped in advance, the damping operation can be programmably carried out by controlling the phase-voltage controller. This can be performed even when a damper which does not have a meter is used.

Figure 7A:
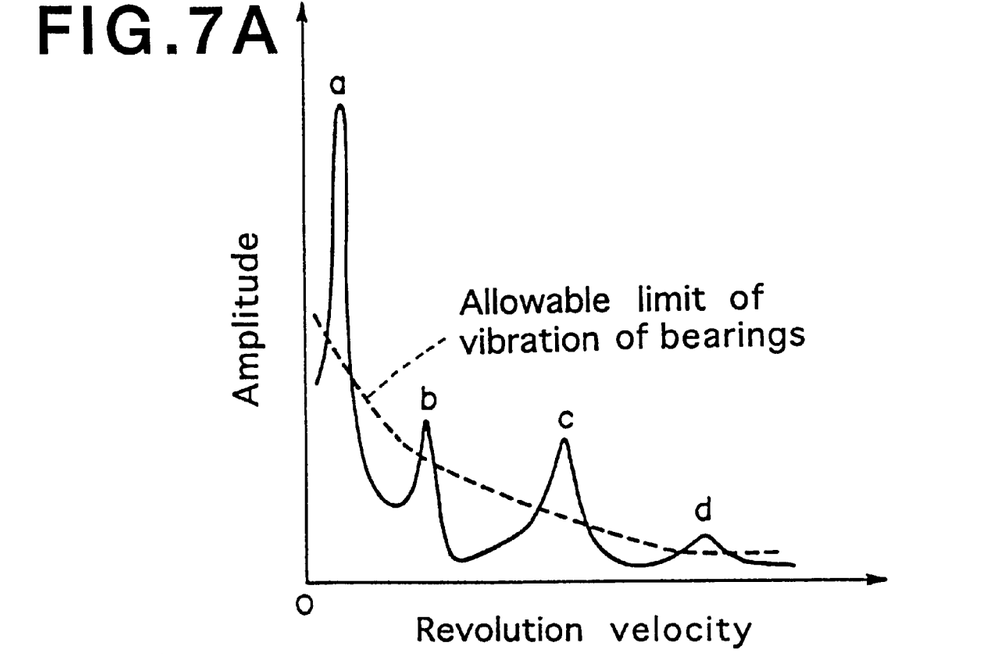
FIG. 7A and 7B are explanatory drawings showing examples of vibration characteristics before and after a vibration offsetting operation.
Figure 7B:
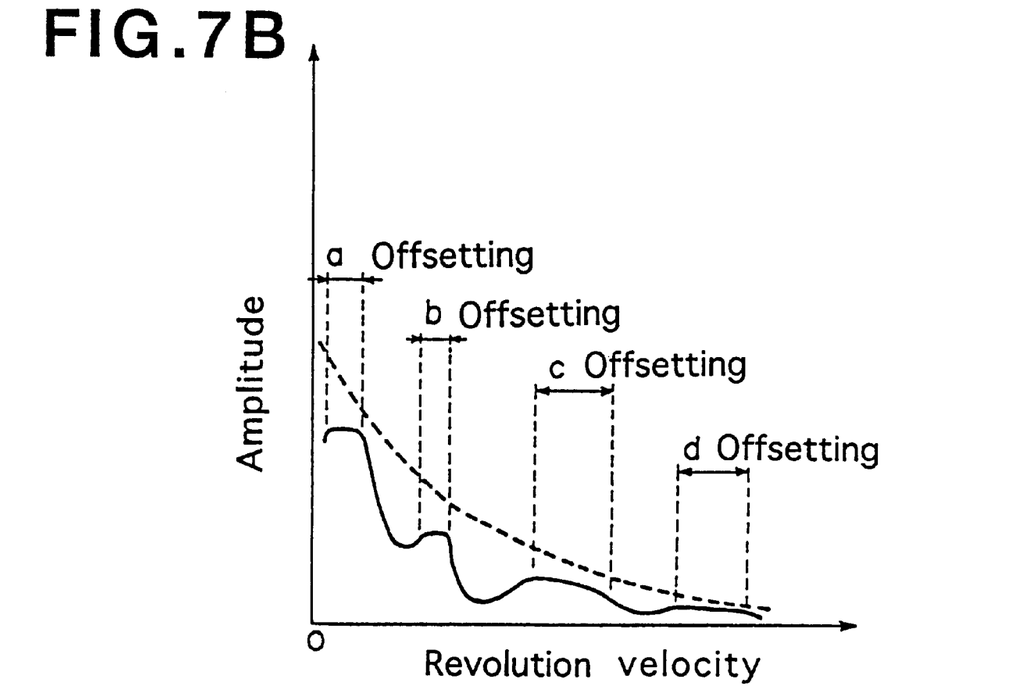

The results of an application of the above-discussed damper to a fourth-order flexural critical speed passing type rotary body is schematically shown in FIG. 7. In the damper used in an experiment, a manual control operation of an open loop control system was performed in a stepped manner. FIG. 7A shows the characteristics of a vibration spectrum before offsetting the vibration, and FIG. 7B shows the characteristics of a vibration spectrum after offsetting the vibration. It is understood that the vibration is damped to a level not higher than an allowable limit of vibration with respect to the first order flexural critical speed, as shown by "a," to the fourth order flexural critical speed, as shown by "b," using a very simple damper controlling operation.

The electromagnetic rotary vibrator for a rotary body according to the present invention can not only be applied to such a damper, but it can also be used as a rotation balancer in which the amount of unbalanced vibration is calculated and the balancing of vibration is then performed by a model method based on conventional techniques. The electromagnetic rotary vibrator can also be applied to the vibration evaluation in a rotating field (for example, the evaluation of bearing yield strength or critical speed variation in a rotating field).

In a conventional method for evaluating the yield strength of a bearing, unbalanced vibration is applied as a test weight to a rotary body and the amount of weight is increased gradually while conducting a rotation test each time weight is added. Therefore, the number of rotation tests performed increases, and many process steps are required. When a rotary body is rotationally vibrated by using the electromagnetic rotary vibrator according to the present invention, the vibration amplitude can be increased at each critical speed, i.e., a vibrational response can be attained arbitrarily This enables a load imparting parameter to be set by one rotation test under high-quality conditions based on the imparting of a dynamic load under the limit conditions of a bearing, and the yield strength of the bearing can be efficiently evaluated.

When the electromagnetic rotary vibrator according to the present invention is used in a rotating field, the variation of the resonance point in accordance with an increase in the revolution velocity of a rotary body can be detected, and the results of the detection can be implemented upon the structural evaluation and designing of the rotary body.

The waveform of the vibrating alternating electric power supplied from the vibrating-damping power source may be a rectangular waveform or a sine waveform as mentioned above. The vibration evaluation is carried out for obtaining a vibrational response. Accordingly, the level of an input may be low, and the waveform thereof may be a rectangular waveform since data is picked up in an arbitrary frequency band. However, especially when the alternating electric power is applied to a damping operation, it is desirable to implement electric power which has a sine waveform of a single frequency. Vibrating a rotary body with alternating electric power having a rectangular waveform, or any other waveform other than a sine waveform, becomes a complex vibrating operation having a basic frequency and an odd number-multiplied frequency such that, when a critical speed exists in an odd number-multiplied frequency during a vibrating operation with a target basis frequency, a vibrational response is made. When an inverter of a rectangular waveform is used, voltage of odd number-multiplied frequencies become smaller in the order of the multiples, and the levels of exciting force become inversely proportional to the frequency, such that a vibrational response is small. However, it should be noted that the region in which the basic frequency is swept becomes broader. Conversely, if these characteristics are utilized, a vibrating operation in a high frequency region can be carried out.

The vibrating-damping power source is not limited to the structure shown in FIG. 6. In addition to the above-described method of converting an output from a rotary body, there is a method in which a vibration waveform is amplified by an amplifier through a synchronizing filter and a phase converter. The methods of vibrating a rotary body on the basis of a vibration-pulse output include (1) a DSP vibrating method using a personal computer, (2) a vibrating method using an oscillator operated synchronously with a trigger, and (3) a vibrating method using an inverter controlled by a personal computer. A rotating magnetic field power can be obtained by various arbitrary methods such as those described above. In these methods, it is necessary that the function of regulating the phase and the amount of electric power of a rotating magnetic field is provided.

The above description is for a case in which the rotary body makes a vibrational response independently at each critical speed as shown in FIGS. 1 and 2. However, depending upon the particular structure of a rotary body, there may arise a case in which a plurality of critical speeds are approached, so that the rotary body vibrates in a coupled manner at the same revolution velocity. When a rotary body makes such a coupled vibrational response, it is difficult to carry out an excellent damping operation by using only a single electromagnetic rotary vibrator. In such a case, by providing electromagnetic rotary vibrators in a plurality of arbitrary places and by carrying out control operations separately, an excellent damping operation can be accomplished.

As described above, the present invention is for a system in which a rotary body is directly vibrated, and the system is capable of applying a high-quality rotational exciting force of an arbitrary frequency to the rotary body electromagnetically and efficiently. Therefore, the present invention can be used as a rotation balancer for calculating the amount of unbalanced vibration and balancing the vibration by a model method based on conventional techniques. The present invention is also capable of setting a load imparting parameter by one rotation test, and being utilized as an efficient method of evaluating the yield strength of a bearing. It is further possible to grasp the variation of a resonance point occurring in accordance with an increase in the revolution velocity of a rotary body, and use the results when designing and evaluating the construction of a rotary body.

Since the present invention is formed so that vibration has an amplitude equal to that of the unbalanced vibration of a rotary body and has a phase which is opposite to that of the vibration is applied electromagnetically to the rotary body, it is possible to damp the vibration by offsetting the unbalanced vibration of the rotary body without substantially requiring a control operation. The performance of this apparatus up to the stage of the passage of the existing fourth order flexural critical speed has already been proven to be excellent. This apparatus can also be applied to an N-order critical speed passing type rotary body having increased critical speeds, and is very effective for an elastic rotary body which is rotated at a high speed. This damper apparatus can also sufficiently perform with the existence of transitional vibrations and unreproducible vibrations, such as thermal unbalance due to a temperature rise during the rotation of a rotary body, deformation unbalance due to rotational stress and fluid unbalance.

What is claimed is:

1. An electromagnetic rotary vibrator for vibrating a rotary body that is supported by bearings, comprising:

a ring-shaped magnet which is bipolarly magnetized and which is to be mounted coaxially on a shaft of the rotary body;

a ring-shaped stator having a coil, wherein said stator is mounted adjacent to said magnet, and wherein the distance between a location of a magnetic pole in said stator and an axis of the shaft is different than the distance between a location of a magnetic pole in said magnet and the axis of the shaft; and a frequency-variable power source which controllably supplies said coil with AC power, thereby generating a rotating magnetic field, whereby said rotating magnetic field interacts with a magnetic field produced by said magnet such that repulsive electromagnetic forces and attractive electromagnetic forces are exerted between said ring-shaped magnet and said ring-shaped stator;

wherein the exertion of the repulsive electromagnetic forces and the attractive electromagnetic forces between said ring-shaped magnet and said ring-shaped stator combine to produce a rotational exciting force which is applied to the rotary body.

2. An electromagnetic rotary vibrator according to claim 1, wherein said ring-shaped magnet is a permanent magnet that is bipolarly magnetized in an axial direction, wherein said magnet and said stator are mounted adjacent to each other in an axial direction.

3. An electromagnetic rotary vibrator according to claim 1, wherein said ring-shaped magnet is a permanent magnet that is bipolarly magnetized in a radial direction, wherein said magnet and said stator are mounted adjacent to each other in a same radial plane.

4. An electromagnetic rotary vibrator according to claim 1, wherein said ring-shaped magnet is a permanent magnet that is bipolarly magnetized in an axial direction, wherein said magnet and said stator are mounted adjacent to each other in a direction to be axial of the shaft, wherein said magnet is mounted on an outer circumferential surface of at least one of a plurality of bearings, and wherein an inner surface of said at least one of said plurality of bearings is mounted to the rotary body.

* * * * *